US 8,041,675 B1

(12) United States Patent
McCain

(10) Patent No.: US 8,041,675 B1
(45) Date of Patent: Oct. 18, 2011

(54) METHOD FOR PERFORMING INCREMENTAL BACKUP OF DATABASE FILES

(75) Inventor: Greg McCain, Avila Beach, CA (US)

(73) Assignee: Symantec Operating Corporation, Mountain View, CA (US)

( * ) Notice: Subject to any disclaimer, the term of this patent is extended or adjusted under 35 U.S.C. 154(b) by 812 days.

(21) Appl. No.: 10/945,128

(22) Filed: Sep. 20, 2004

Related U.S. Application Data

(60) Provisional application No. 60/598,251, filed on Aug. 2, 2004.

(51) Int. Cl.
*G06F 17/30* (2006.01)
(52) U.S. Cl. ............... 707/640; 707/922; 707/E17.044; 714/20
(58) Field of Classification Search .................. 707/204; 714/15; 709/206
See application file for complete search history.

(56) References Cited

U.S. PATENT DOCUMENTS

| 5,263,154 | A  | * | 11/1993 | Eastridge et al. | ................ | 714/6 |
| 6,981,177 | B2 | * | 12/2005 | Beattie | ............................ | 714/20 |
| 2002/0146096 | A1 | * | 10/2002 | Agarwal et al. | ............ | 379/88.13 |
| 2003/0110227 | A1 | * | 6/2003 | O'Hagan | ....................... | 709/206 |
| 2003/0172167 | A1 | * | 9/2003 | Judge et al. | ................... | 709/229 |
| 2004/0064488 | A1 | * | 4/2004 | Sinha | ............................. | 707/204 |
| 2005/0144520 | A1 | * | 6/2005 | Tuma et al. | ..................... | 714/15 |
| 2005/0246398 | A1 | * | 11/2005 | Barzilai et al. | ................ | 707/204 |

OTHER PUBLICATIONS

SynchPst for Outlook, "Sync your Outlook Personal Folders between two or more PCs, or between your desktop and your laptop,—automatically," www.synchpst.com, printed Sep. 8, 2004, © 2004 Wisco.

\* cited by examiner

*Primary Examiner* — Shyue Jiunn Hwa
(74) *Attorney, Agent, or Firm* — Campbell Stephenson LLP

(57) ABSTRACT

A method and apparatus for incrementally backing up database files is described. In one embodiment, the present invention replicates an original database file for the purpose of creating a backup database file. The backup database file is subsequently stored in a data store and the original database file is monitored for at least one change (i.e., new e-mail message). In response to a detected change, the change to the original database file is copied to the backup database file so that the two database files are replicas of each other.

8 Claims, 2 Drawing Sheets

METHOD FOR PERFORMING INCREMENTAL BACKUP OF DATABASE FILES

CROSS-REFERENCE TO RELATED APPLICATIONS

This application claims benefit of U.S. provisional patent application Ser. No. 60/598,251, filed Aug. 2, 2004, which is herein incorporated by reference.

BACKGROUND OF THE INVENTION

1. Field of the Invention

Embodiments of the present invention generally relate to file storage, and more particularly, to a method for incrementally backing up database files.

2. Description of the Related Art

Modern computer networks generally comprise a plurality of user computers connected to one another and to a computer server via a communication network. To provide redundancy and high availability of the information in applications that are executed upon the computer server, multiple computer servers may be arranged in a cluster, i.e., forming a server cluster. Such server clusters are available under the trademark VERITAS CLUSTER SERVER from Veritas Software Corporation at Mountain View, Calif. In a server cluster, a plurality of servers communicate with one another to facilitate failover redundancy such that when software or hardware, i.e., computer resources, become inoperative on one server, another server can quickly execute the same software that was running on the inoperative server substantially without interruption. In addition to providing redundancy and high availability measures, a computer network is required to backup copious amounts of data on cluster servers in order to achieve a reliable and steadfast network environment.

One form of data commonly backed up to a cluster server is a database file. Traditional methods for backing up database files residing on a client computer, such as MICROSOFT OUTLOOK Personal Folder Files (known as PST files because these files carry the extension "pst"), consume a significant amount of network bandwidth. Notably, considerable amounts of redundant data are transferred over the network every time a backup of these files is performed. For example, a PST file contains detailed information about a user's e-mail, calendar, contacts, journal, notes, and other data needed to support the functionality of OUTLOOK. A PST file, or any database file, is typically very large in size and is frequently modified. However, backing up the entire database file every time a change is made to the file is an inefficient use of network resources.

Therefore, a need exists in the art for a more efficient method and apparatus for the capture and backup the incremental changes in a database file.

SUMMARY OF THE INVENTION

The invention provides a method and apparatus for incrementally backing up database files. In one embodiment, the present invention replicates an original database file in order to create a backup database file. The backup database file is subsequently stored in a data store and the original database is monitored for at least one change (i.e., new message in e-mail). In response to a detected change, the change to the original database file is copied to the backup database file so that the two database files are replicas of each other.

BRIEF DESCRIPTION OF THE DRAWINGS

The following detailed description makes reference to the accompanying drawings, which are now briefly described.

While the invention is described herein by way of example using several embodiments and illustrative drawings, those skilled in the art will recognize that the invention is not limited to the embodiments of drawing or drawings described. It should be understood that the drawings in detailed description thereto are not intended to limit the invention to the particular form disclosed, but on the contrary, the invention is to cover all modification, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to.

DETAILED DESCRIPTION

Figure 1:
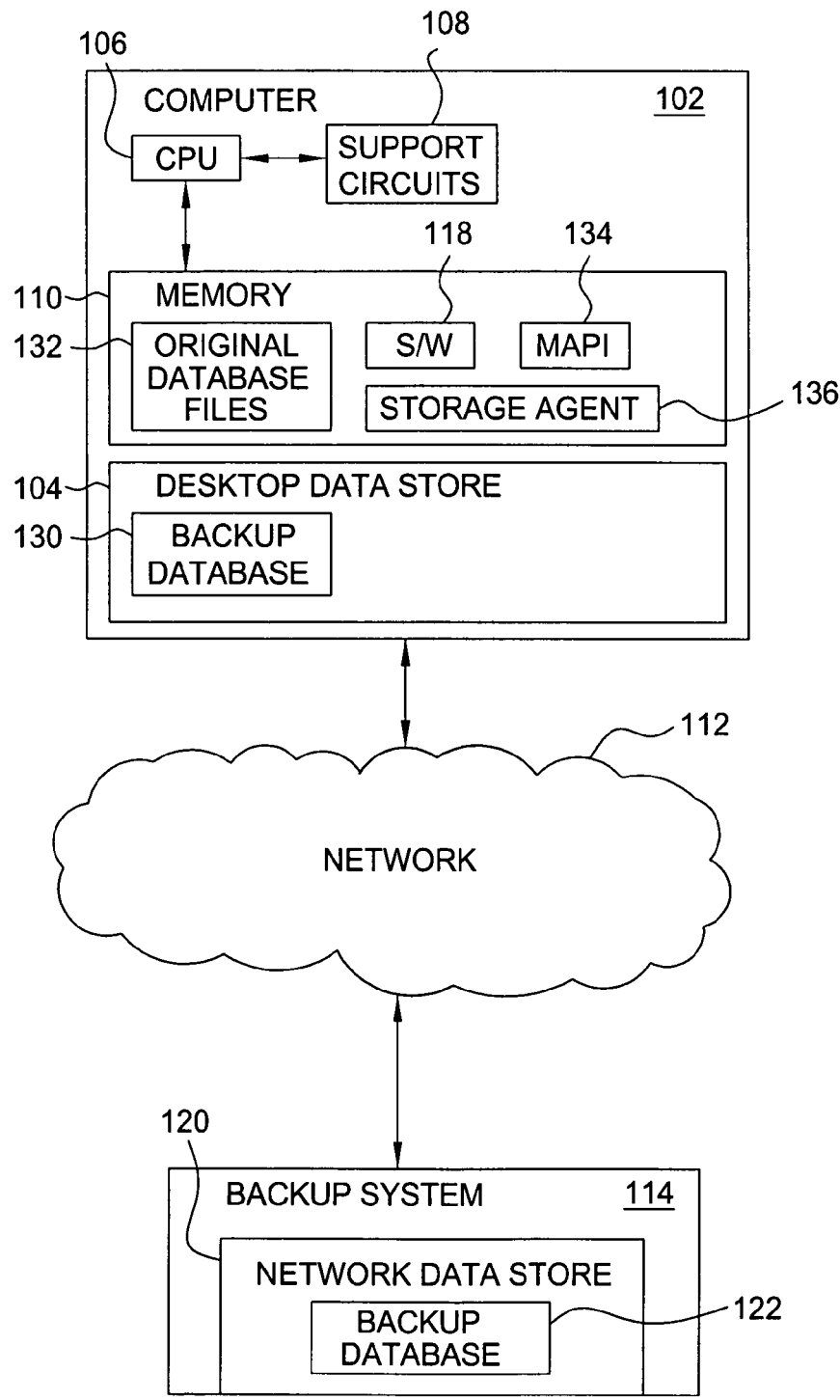
FIG. 1 is a block diagram of a computer system that operates in accordance with the present invention.

FIG. 1 depicts a computer network 100 in which one embodiment of the present invention may be utilized. The invention, as shall be discussed in detail below, is a method and apparatus for performing incremental backup of a database. More specifically, this invention monitors a database file for incremental changes and subsequently updates a backup database file to incorporate these changes.

The computer system 100 comprises a computer 102 coupled to a backup system 114 through a conventional data communications network 112 (e.g., the Internet, LAN, WAN, and the like). The computer 102 may include an individual computer, wireless device, personal digital assistant, desktop computer, laptop computer, and the like. Similarly, the computer system 100 could also include a server or server cluster as well. The backup system 114 contains a Network Data Store 120, which acts as a backup storage unit for storing database backup files 122. These backup files 122 are copies of the original backup database files 132 stored on the computer 102 and may be updated immediately (provided there is a network connection) or in accordance with a predefined backup schedule.

The computer 102 generally includes at least one central processing unit (CPU) 106, support circuits 108, memory 110, and a Desktop Data Store 104 (e.g., Desktop and Laptop Option (DLO) cache). The CPU 106 is coupled to the memory 110 and support circuits 108 and may include one or more commercially available processors. The support circuits 108 are well known circuits that include cache, power supplies, clocks, input/output interface circuitry, and the like.

In one embodiment, the Desktop Data Store 104 may be a storage folder that contains backup database files 130. Backup database files 130, which reside on remote computers not connected to the network 112 (e.g., laptop computers), are typically stored in the Desktop Data Store 104 until the computer 102 establishes a network connection. Once this connection to the network 112 is made, the laptop may upload the data stored in the Desktop Data Store 104 to a backup system 114. Alternatively, these database files may reside in the Desktop Data Store 104 of a computer 102 that is connected to the network 112 on a regular basis. In this particular scenario, the computer may be configured to backup its files and/or messages to the backup system 114 in one of several ways. One backup mode entails backing up the original file 132 to the backup system 114 (e.g., a network server) immediately as changes to the original file 132 occur in real time. Another mode is dependent on the user to manually backup the files to the backup system 114 at the user's convenience. Yet another mode involves the backing up of files according to a predefined schedule.

The invention is capable of monitoring several types of database files 130 including, but not limited to, MICROSOFT OUTLOOK PST personal folder files, MICROSOFT EXCHANGE database files, MICROSOFT Offline Personal Folder Files (known as OST files because these files carry the extension "ost"), and the like.

MICROSOFT OUTLOOK may be configured to operate in a "cached exchange mode" that enables the application to synchronize messages with MICROSOFT EXCHANGE by utilizing OST files. More specifically, OST files are used to read and send (i.e., store a message in an outbox) electronic mail while the user is offline. While the user is offline, the changes made to an OST file may be replicated to the client's data store. With the capability to monitor the modifications to a file, this invention effectively adds an additional degree of redundancy for offline users. Notably, any change made to the OST file is relayed to the Exchange server (e.g., the backup system 114) when the connection to the network 112 is established.

The memory 110 may include random access memory, read only memory, removable disk memory, flash memory, and various combinations of these types of memory. The memory 110 is sometimes referred to as main memory and may in part be used as cache memory. The memory 110 possesses various software applications 118, original database files 132, a storage agent 136, and a mail application program interface (MAPI) 134. The original database files 132 may include PST files, OST files, EXCHANGE database files, and the like. The storage agent 136 is a piece of software responsible for protecting the user's data. This agent 136 also handles the backup and synchronization of data files that reside in both the Desktop Data Store 104 and the Network Data Store 120.

The MAPI 134 is a specialized API used to actively monitor changes to an original database file 132 via an event registration process. The event registration process is the means by which the MAPI detects incremental changes (i.e., events) to the original database file 132, such as the addition of a new e-mail message to a local PST file located on the computer 102.

Figure 2:
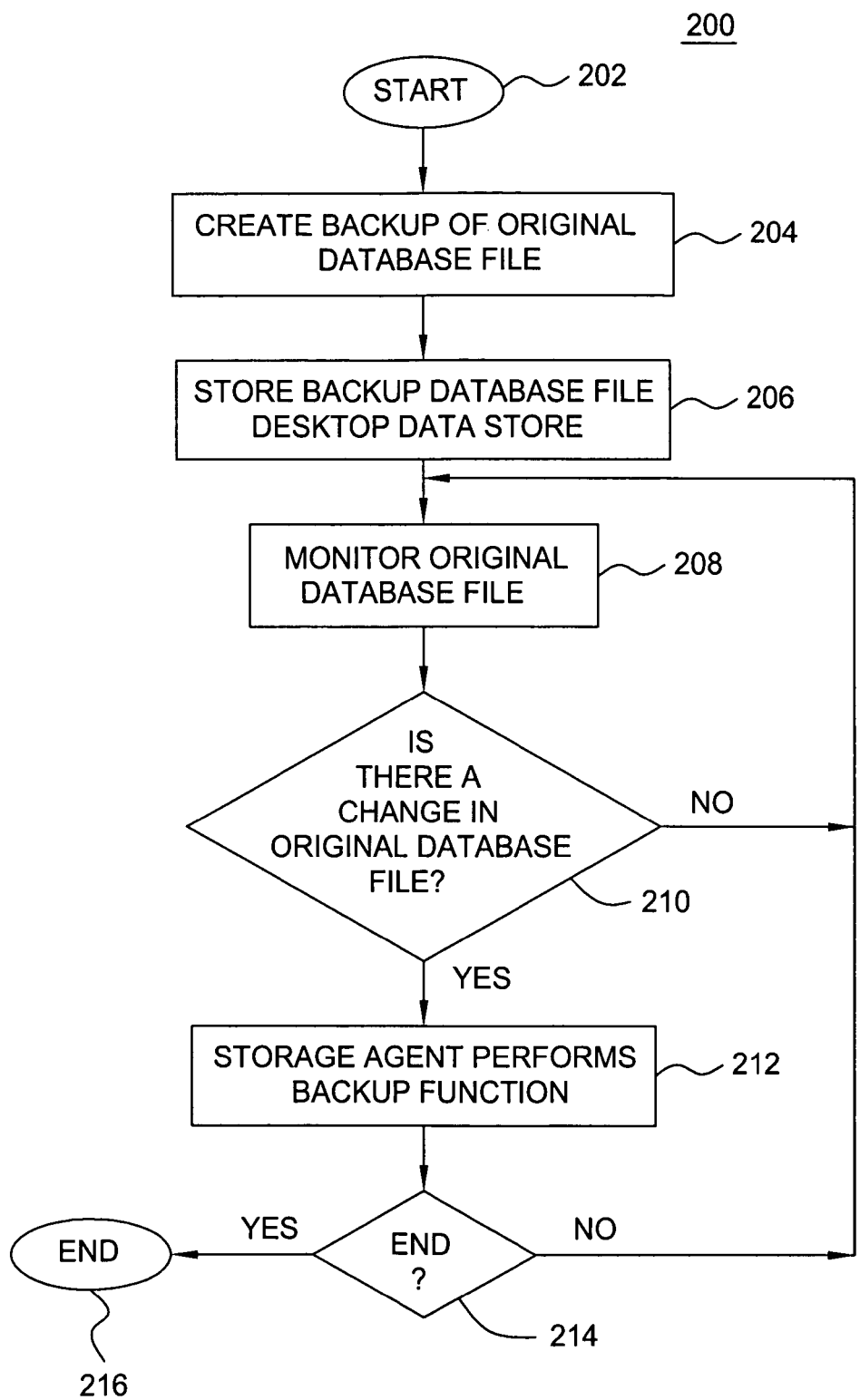
FIG. 2 depicts a flow diagram of a method for incrementally backing up database files in accordance with the present invention.

FIG. 2 depicts a flow diagram of one embodiment of a method 200 for incrementally backing up database files that operates in accordance with the present invention. Although PST database files are referred to in the following method 200 for the sake of example, this method 200 is applicable for other database files (e.g., MICROSOFT EXCHANGE database files, OST files, etc.). The method 200 begins at step 202 and proceeds to step 204, where a backup database file 130 of an entire local PST database 132 (i.e., the original database file 132) is created. More specifically, the backup database 130 is created through a process that involves traversing all of the electronic messages contained in the PST database 132 and replicating the file to create an identical backup 130. At step 206, the resulting backup PST data file 130 is stored in a Desktop Data Store (e.g., DLO cache) 104. For enhanced security, the PST backup file 130 may be transferred to a Network Data Store 120 via the network 112. The method 200 then continues to step 208 where, after the initial full backup file 130 is created, the original PST file 132 is monitored for changes. Notably, this is accomplished by monitoring for events and changes (e.g., the addition or deletion of messages to the original PST database 132) in the original database 132 via the MAPI 134.

At step 210, a determination is made as to whether a change in the original PST database file 132 is detected. If at step 210, the method 200 determines that the original database 132 has not been modified, then the method 200 returns to step 208 and the MAPI 134 continues to monitor for changes. Alternatively, if the original PST database 132 has been modified (e.g., the addition or deletion of a message to the original PST database 132), the method 200 proceeds to step 212.

At step 212, a storage agent 136 performs a backup function (in much the same manner that the initial full backup procedure was performed) for each change detected in the original PST database 132. This step may occur immediately after the original database file 132 has been changed (i.e., in real-time). Similarly, this backup is not a file-level replication, but rather the storage agent 136 is replicating the change, e.g., an e-mail update transaction, to the Desktop Data Store 104. At step 214, a decision is made as to whether or not the program should end once the backup function is completed. If additional event monitoring is required, the method 200 returns to step 208. If there is no need to monitor the original database file 132, the method ends at step 216.

In another embodiment of the invention, method 200 takes place on a server computer instead of a client computer. Specifically, the MAPI 134 is utilized to actively monitor the changes or events of MICROSOFT EXCHANGE database files, MICROSOFT OST files, and the like, residing on the server computer.

The present invention provides the ability to backup a database file, such as a PST file, on an incremental basis. Notably, the invention monitors the original database file for changes and subsequently alters the backup database to reflect the modification in the event a change actually occurs. By backing up large databases on an incremental basis, this invention avoids the needless consumption of network resources involved with backing up an entire database for the sake of small and minor modifications.

While the foregoing is directed to embodiments of the present invention, other and further embodiments of the invention may be devised without departing from the basic scope thereof, and the scope thereof is determined by the claims that follow.

What is claimed is:

1. A method comprising:
   replicating, using a computer, an original database file to create a backup database file, wherein
      the original database file comprises a plurality of e-mail messages, and
      the backup database file comprises respective replicas of the plurality of e-mail messages;
   storing the backup database file in a data store;
   registering with a mail application programming interface (MAPI) to monitor the original database file, wherein
      the registering operates to configure the MAPI to detect a first event and a second event in the original database file;
   determining whether the MAPI detects the first event or the second event in the original database file, wherein
      the first event in the original database file comprises an addition of a new e-mail message to the plurality of e-mail messages, and the second event comprises a deletion of at least one e-mail message from the plurality of e-mail messages; and updating the backup database file, wherein
the updating updates the backup database file by replicating the first event or the second event, and
the updating is performed in response to determining that the MAPI detects the first event or the second event.

2. The method of claim 1, wherein the data store is located on a user computer.

3. The method of claim 1, wherein
the replication of the first event operates to add a copy of the new e-mail message to the backup database file, and
the replication of the second event operates to delete a copy of the at least one e-mail message from the backup database file.

4. A non-transitory computer-readable medium comprising program instructions, wherein the program instructions are executable by one or more processors to implement a method, the method comprising:
replicating an original database file to create a backup database file, wherein
the original database file comprises a plurality of e-mail messages, and
the backup database file comprises respective replicas of the plurality of e-mail messages;
storing the backup database file in a data store;
registering with a mail application programming interface (MAPI) to monitor the original database file, wherein
the registering operates to configure the MAPI to detect a first event and a second event in the original database file;
determining whether the MAPI detects the first event or the second event in the original database file, wherein
the first event in the original database file comprises a deletion of an existing e-mail message from the plurality of e-mail messages, and
the second event comprises an addition of a new e-mail message to the plurality of e-mail messages; and
updating the backup database file, wherein
the updating updates the backup database file by replicating the first event or the second event, and
the updating is performed in response to determining that the MAPI detects the first event or the second event.

5. The non-transitory computer-readable medium of claim 4, wherein
the data store is located on a user computer.

6. The non-transitory computer-readable medium of claim 4, wherein
the replication of the first event operates to delete a copy of the existing e-mail message from the backup database file, and
the replication of the second event operates to add a copy of the new email message to the backup database file.

7. Apparatus comprising:
a storage agent for
replicating an original folder file located on a user computer to create a backup folder file, wherein
the original folder file comprises a plurality of e-mail messages, and
the backup folder file comprises respective replicas of the plurality of e-mail messages;
registering with a mail application programming interface (MAPI) to monitor the original folder file, wherein
the registering operates to configure the MAPI to detect a first event and a second event in the original folder file; and
storing the backup folder file in a data store; and
an application program interface for
determining whether the MAPI detects the first event or the second event in the original folder file, wherein
the first event in the original folder file comprises an addition of a new e-mail message to the plurality of e-mail messages, and
the second event comprises a deletion of at least one e-mail message from the plurality of e-mail messages;
wherein, in response to the application program interface determining that the MAPI detects the first event or the second event,
the storage agent is further configured to update the backup folder file by replicating the first event or the second event.

8. The apparatus of claim 7, wherein
the e-mail message is added to the original folder file.

* * * * *